(12) United States Patent
Aggarwal et al.

(10) Patent No.: US 6,631,413 B1
(45) Date of Patent: Oct. 7, 2003

(54) METHOD FOR OPTIMIZING PROFITS IN ELECTRONIC DELIVERY OF DIGITAL OBJECTS

(75) Inventors: Charu C. Aggarwal, Ossining, NY (US); Joel L. Wolf, Katonah, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,008

(22) Filed: Jan. 28, 1999

(51) Int. Cl.[7] .............................................. G06F 13/00
(52) U.S. Cl. ....................... 709/226; 709/102; 709/219; 709/238
(58) Field of Search ................................ 709/102, 103, 709/104, 201, 202, 203, 219, 223, 226, 232, 235, 238

(56) References Cited

U.S. PATENT DOCUMENTS

| | | | |
|---|---|---|---|
| 5,555,441 A | | 9/1996 | Haddad |
| 5,673,256 A | | 9/1997 | Maine |
| 5,684,963 A | * | 11/1997 | Clement ..................... 705/26 |
| 5,754,787 A | * | 5/1998 | Dedrick ..................... 709/228 |
| 5,920,701 A | * | 7/1999 | Miller et al. ................ 709/228 |
| 6,014,701 A | * | 1/2000 | Chaddha ..................... 709/226 |
| 6,101,479 A | * | 8/2000 | Shaw ............................ 705/8 |
| 6,233,226 B1 | * | 5/2001 | Gringeri et al. ............ 370/252 |
| 6,233,493 B1 | * | 5/2001 | Cherneff et al. ............ 700/95 |

* cited by examiner

Primary Examiner—Viet D. Vu
(74) Attorney, Agent, or Firm—F. Chau & Associates, LLP (57) ABSTRACT

In accordance with the present invention, a method for selecting a channel and delivery time for digital objects for a broadcast delivery service including multiple channels of varying bandwidths includes the steps of selecting digital objects to be sent over the multiple channels, generating a schedule and pricing for the digital objects based on the digital object selected and existing delivery commitments and manipulating the schedule and pricing to provide a profitable delivery of the digital objects. A system is also included.

20 Claims, 7 Drawing Sheets

METHOD FOR OPTIMIZING PROFITS IN ELECTRONIC DELIVERY OF DIGITAL OBJECTS

BACKGROUND OF THE INVENTION

1. Field of the Invention

The present invention relates to digital object delivery systems and, more particularly, to a system and method for optimizing profits in transmissions of digital objects.

2. Description of the Related Art

With the increased popularity of e-commerce, many customers are now purchasing objects of an essentially digital nature on the world wide web. Typical examples of such objects include CDs containing music or other audio, and DVDs containing movies or other video. But there are many other examples, including video games and other software. At present customers who purchase such digital objects generally have the object sent to them via mail or a similar private delivery service. In the near future, it will probably become more economical and more satisfactory to deliver such digital objects electronically. The customer may receive the digital object more quickly, for example. The e-commerce merchant need not maintain or create a large inventory.

One major means of electronic delivery will involve utilizing spare bandwidth in a broadcast environment such as cable TV, satellite TV, or TV via the airwaves. In today's TV environment, for example, some spare bandwidth usually exists even when a channel is broadcasting normal programming, typically in the form of the so-called vertical blanking interval or VBI. Similarly, some channels will go "dark" in the middle of the night or possibly at other times, potentially leaving the entire channel bandwidth available for broadcasting digital objects.

Therefore, a need exists for a system and method for management and allocation of spare bandwidth in a manner which optimizes the revenue and ultimately the profits of e-commerce merchant's delivery services.

SUMMARY OF THE INVENTION

In accordance with the present invention, a method for selecting a channel and delivery time for digital objects for a broadcast delivery service including multiple channels of varying bandwidths includes the steps of selecting digital objects to be sent over the multiple channels, generating a schedule and pricing for the digital objects based on the digital object selected and existing delivery commitments and manipulating the schedule and pricing to provide a profitable delivery of the digital objects.

In alternate methods, the step of generating a schedule and pricing may include the step of scheduling the delivery of the digital objects by determining when to deliver each digital object and determining which channel will carry each digital object to provide a highest possible amount of revenue from the delivery of the digital objects. The method may include the step of determining an amount of time needed to deliver a digital object pursuant to a request, and offering delivery options which meet or exceed the amount of time. The step of dynamically deciding which delivery times to provide the highest possible amount of revenue and offering delivery options in accordance with the delivery times is preferably included. The method may also include the steps of dynamically deciding a number of delivery times to provide the highest possible amount of revenue and discounting costs for the delivery times to encourage customers to choose among the number of delivery times.

Further, the step of manipulating the schedule and pricing may further include the steps of formulating a transportation problem to determine a delivery sequence for the digital objects and solving the transportation program to determine the delivery sequence based on profitability. The step of solving the transportation program may include the step of assuming, temporarily, all deliveries include the same amount of work. The method further includes the step of swapping the digital objects to improve the delivery sequence based on profitability. The step of swapping preferably includes the step of swapping the digital objects by employing a greedy heuristic. The step of generating a schedule and pricing for the digital objects is preferably based on available bandwidth of the channels.

Another method for selecting a channel and delivery time for digital objects for a broadcast delivery service including multiple channels of varying bandwidths includes the steps of selecting digital objects to be sent over the multiple channels, formulating and solving a transportation problem to generate a delivery sequence for the digital objects according to the digital objects and existing delivery commitments, manipulating the delivery sequence based by determining when to deliver each digital object and determining which channel will carry each digital object to provide a highest possible amount of revenue from the delivery of the digital objects.

In other methods, the steps of determining an amount of time needed to deliver a digital object pursuant to a request, and offering delivery options which meet or exceed the amount of time may be included. The method may further include the steps of dynamically deciding which delivery times to provide the highest possible amount of revenue and offering delivery options in accordance with the delivery times. The method may also include the steps of dynamically deciding a number of delivery times to provide the highest possible amount of revenue, and discounting costs for the delivery times to encourage customers to choose among the number of delivery times. The step of formulating and solving the transportation problem may include the step of assuming, temporarily, all deliveries include the same amount of work.

The method may include the step of swapping the digital objects to improve the delivery sequence based on profitability, and the step of swapping the digital objects may employ a greedy heuristic.

A system for selecting a channel and delivery time for digital objects for a broadcast delivery service including multiple channels of varying bandwidths includes at least one user interface for selecting objects to be transmitted thereto, the user interface for identifying and receiving object transmissions corresponding to the selected objects over channels having available bandwidth. A scheduler is included for managing usage of network channels and object transmission sequences, the scheduler for generating a schedule and pricing for the digital objects to be transmitted based on the digital objects selected and existing delivery commitments, the scheduler manipulating the schedule and pricing to provide a profitable delivery of the digital objects.

In alternate embodiments, the scheduler may determine when to deliver each digital object and which channel will carry each digital object to provide a highest possible amount of revenue from the delivery of the digital objects, and the scheduler may also determine an amount of time needed to deliver a digital object pursuant to a request, and offers delivery options which meet or exceed the amount of time. The scheduler may determine a number of delivery times which provide the highest possible amount of revenue and offers delivery options in accordance with the number of delivery times, and the scheduler may also determine a number of delivery times to provide the highest possible amount of revenue and discounts costs for the delivery times to encourage customers to choose among the number of delivery times. The scheduler may include means for formulating and solving a transportation problem to determine a delivery sequence for the digital objects based on profitability. The scheduler may employ a greedy heuristic for swapping the digital objects to improve the delivery sequence based on profitability. The multiple channels of varying bandwidths are preferably included in a television network, a satellite television network and/or a cable television network.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention includes a system and method for managing and allocating spare bandwidth in a manner which optimizes the revenue and ultimately the profits of e-commerce merchant's delivery services. The present invention seeks to optimize profits by scheduling the broadcasts of various digital objects efficiently by controlling delivery price options offered to a given customer based on other outstanding activity and, by pricing the delivery options offered to a given customer based on other outstanding activity. These last two components of the present invention allow the e-commerce merchant to react to varying customer demands in a reasonable and profitable manner.

Although the bandwidth of each channel may vary over time, it does so very predictably according to predetermine schedules agreed upon by the TV stations. This property of broadcasting via TV channels is quite valuable, since it allows for a high degree of certainty in scheduling. Furthermore, it can be safely assumed that the speedup of digital broadcast varies more or less linearly with bandwidth, since transmitting the digital objects involves very little overhead. Suppose, for example, that channel 1 has twice the bandwidth of channel 2. Then it will take approximately half as long to broadcast a digital object on channel 1 as on channel 2.

The present invention implements an atomic unit of transmission of the digital object(s) as the entire object, which is transmitted in order from start to finish. This permits for significantly simpler software and set box hardware at the customer end (user interface), and may be preferable for an electronic delivery service. In one illustrative embodiment, a customer is offered to choose an acceptable subset of a selection of transmission costs which depend on the time to complete delivery of the digital object. Any acceptable function of time to cost may be used. However, non-limiting examples may include the following. A pricing function may be monotone nonincreasing, that is, it will not cost more to complete the transmission of a digital object at a later rather than an earlier time. Further, costs which can be expressed as step functions may be employed. For example, a customer may pay $3 for delivery within one hour, $2 for delivery more than one hour but within one day, $1 for delivery more than one day but within one week, and receive free delivery thereafter. The step functions are easier for the customer to pick among, and are comparable to current pricing schemes for mail and private delivery services. Of course, the total cost to the various customers corresponds to the revenue of the e-commerce merchant.

Broadcasts of the same digital object to multiple customers may be "batched". That is, each customer may receive the same broadcast of that particular digital object, with no extra expense to the e-commerce merchant. Thus, multiple customers may be satisfied by a single transmission of the digital object. The revenue achieved by the e-commerce merchant by such a single transmission equals the sum of the costs charged to each customer. There are great revenue benefits to be had by the e-commerce merchant when delivering the more popular digital objects by implementing batching.

Figure 1:
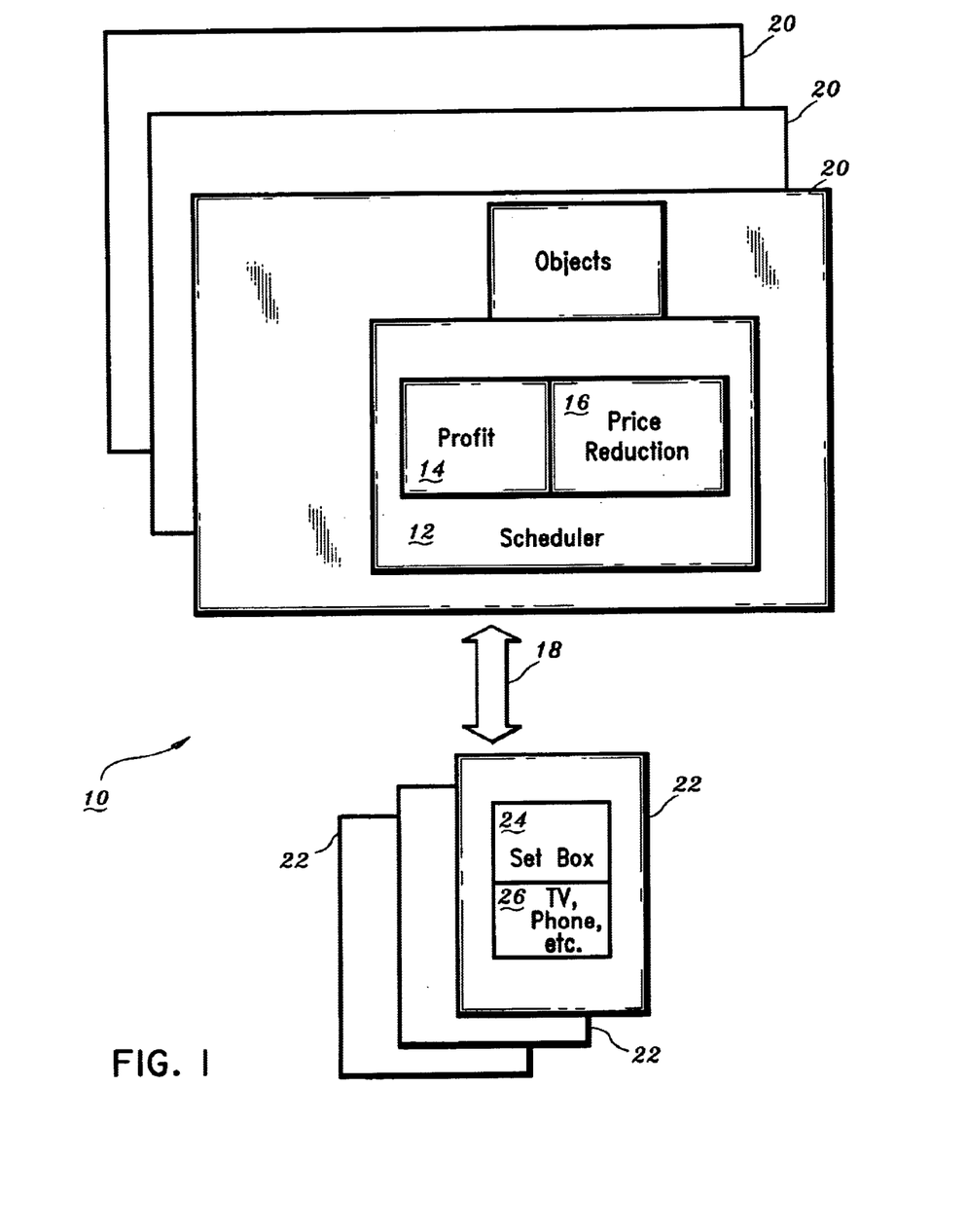
FIG. 1 is a block diagram of a system for optimizing profits for the delivery of digital objects in accordance with the present invention.

Referring now to the drawings in which like numerals represent the same or similar elements and initially to FIG. 1, a block diagram of a system 10 in accordance with a preferred embodiment of the present invention is shown. System 10 includes an intelligent scheduler 12 for transmitting purchased digital objects to the customers. A profit component 14 is included which determines which, if any, standard transmission time pricing alternatives would not be profitable to offer to a given customer, either due to reasons of infeasibility or because if such times were actually achieved in a schedule they would cause the e-commerce merchant to be less profitable by some predetermined amount. A price reduction component 16 is included which determines when it is a good idea to offer the customer reduced pricing, perhaps because the digital object purchased is identical to one already scheduled to be transmitted in the near future. If such "bargains" are to be offered, this step also determines intelligent pricing strategies. Profit component 14 and price reduction component 16 may depend heavily on the other outstanding activity at the moment the customer makes his purchase. System 10 includes a network 18 which may include a televison network, a telephone network, a satellite television network, a cable network and the like. Network 18 may include a plurality of transmission sources 20. Transmissions from transmission sources 20 are received by receivers or user interfaces 22 which may include televison sets 26, phones and the like. Each user interface 22 preferably includes a set box 24 which employs software and hardware to receive transmissions of digital objects ordered and delivered over network 18 from transmission sources 20. A more detailed description of these components follows.

Scheduler 12 seeks to build a high quality schedule for delivery of digital objects over a broadcast network to customers who arrive and make purchases at arbitrary times. Scheduler 12 is intended to be invoked iteratively. Scheduler 12 may, for example, be invoked after some predetermined number of new customer purchases, or perhaps after each customer purchase. Alternatively, scheduler 12 may be invoked after some predetermined time interval has elapsed. When invoking scheduler 12, previous scheduling decisions may be honored, revisited or a combination of both.

Figure 3:
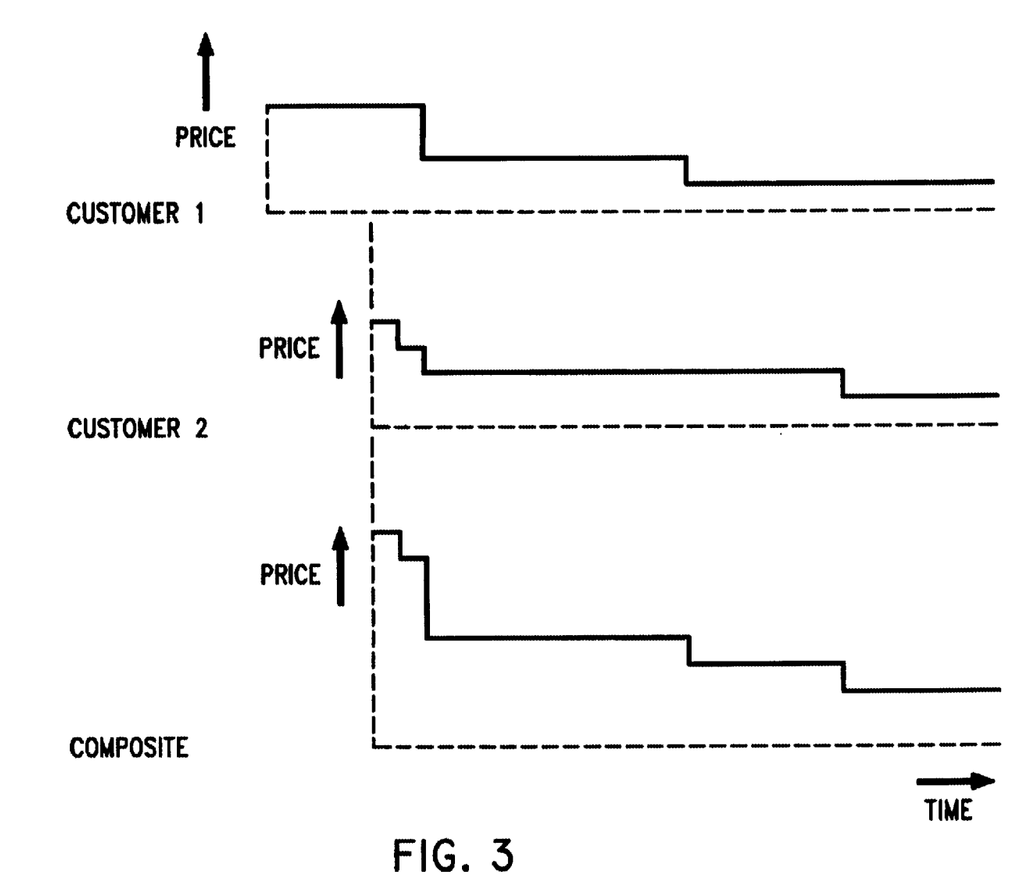
FIG. 3 depicts sample step functions corresponding to revenue for a broadcast task of a particular digital object including a composite sum of two individual step functions for two customers who have purchased that digital object in accordance with the present invention.

At a given moment in time (corresponding to a scheduler invocation) there are M distinct digital objects to be scheduled and N distinct channels. Suppose that each of P outstanding customers has purchased a digital object and is awaiting the start of delivery. Then, there is an "assignment" function A: $\{1,\ldots,P\} \to \{1,\ldots,M\}$. For each digital object $1 \leq i \leq M$ one can construct a composite cost function $h_i$ of time t measured from the start of the current scheduling invocation. This composite function is illustrated in FIG. 3 for an exemplary choice of customer delivery revenue functions. In FIG. 3, each customer is offered a set of possible times for delivery, and a price which decreases for each successive time window. (Again, the monotonicity of the pricing arrangements is not essential, but is illustrative and may be favorable to both the customers and the e-commerce merchants.) The customers (1 and 2) choose a subset of possible times for delivery, and the choices for two customers (1 and 2) who have ordered the same digital object are shown in the FIG. 3. It is assumed that digital object delivery for customer 1, who has arrived first, has not yet commenced at the current scheduler invocation time, which is for simplicity assumed to be at the arrival time of customer 2. So each customer contributes a step cost function to the overall mix for the digital object. Thus, the overall cost function for this object is the sum of the two step functions associated with the individual customers for the appropriate time domain, and this is itself a step function (Composite). The step functions are selected for illustrative purposes. Any function of time may be employed.

One goal of scheduler 12 is to maximize the total revenue across all digital objects being scheduled at the particular moment in time. This scheduling problem is technically hard from the perspective of computational complexity. (Officially, it belongs to the category of so-called NP-hard problems.) See for example, Garey, M. and Johnson, D., *Computers and Intractability*, W. H. Freeman and Company, 1979, incorporated herein by reference, for a discussion of the theory of NP-hard problems.

Figure 2:
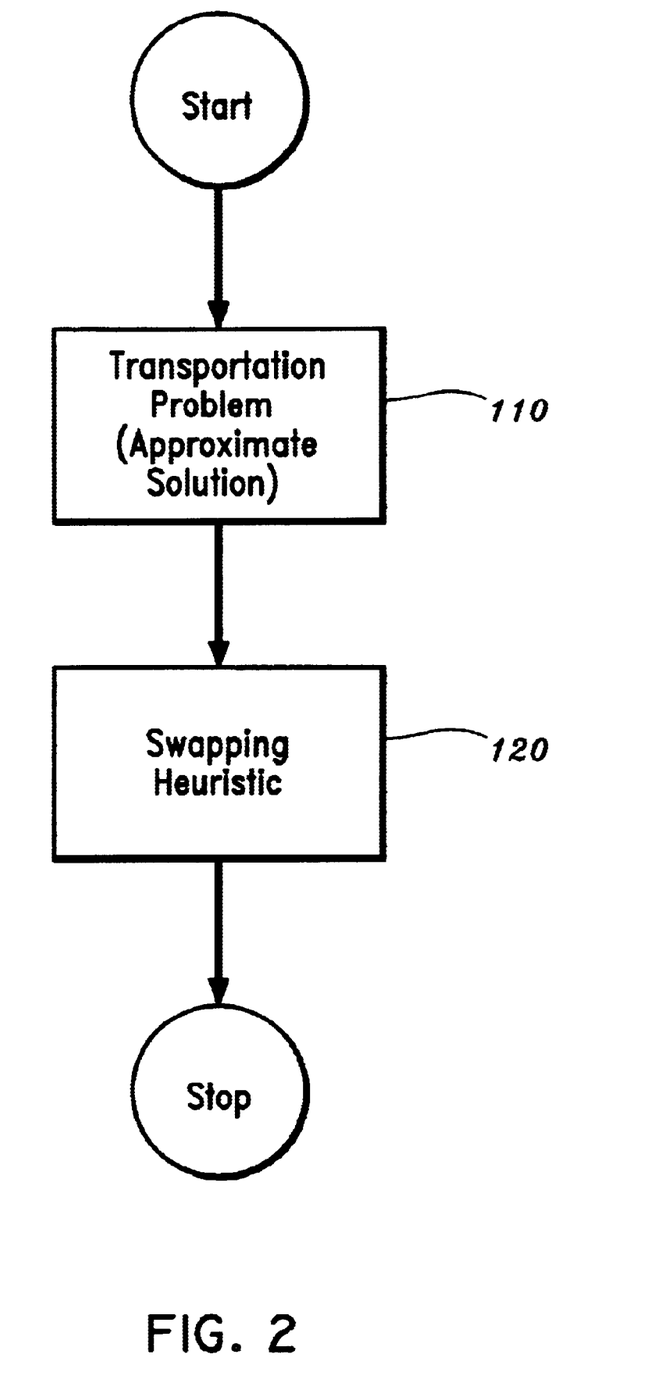
FIG. 2 is a flow/block diagram showing operations of a scheduler for scheduling transmission of the digital objects in accordance with the present invention.

Referring to FIG. 2, a flow diagram is shown for scheduling delivery of digital objects in accordance with the present invention. In block 110, assuming that the various tasks involve an equal amount of work, which is an "approximation", the resulting problem may be solved efficiently as a so-called "transportation" problem. (See, for example, Ahuja, R., Magnanti, T. and Orlin, J., *Network Flows*, Prentice Hall, 1993, incorporated herein by reference.) Furthermore, the assumption is not too far from being correct for the distribution of CDs or DVDs or other digital objects. For example, CDs tend to last for approximately one hour, and the variance is relatively small. Movies tend to last for approximately ninety minutes, with similarly small variance. Thus, an average or a maximum task size may be used as a good approximation, and this task size will preferably represent a reasonable surrogate for the true task sizes. In one illustrative embodiment, the equal amount of work assumption is employed. This may be implemented in block 110 of FIG. 2; however, other assumptions may be used for formulating the "transportation" problem.

In block 120, a cleanup greedy swapping heuristic is employed which is preferably based on packing according to true task sizes, with a possible "bang for the buck" or efficiency variable measure employed to create a task ordering. Block 120 eliminates the problems associated with the task size assumptions which may have been introduced in block 110, and makes the scheduling realistic and accurate.

Figure 4:
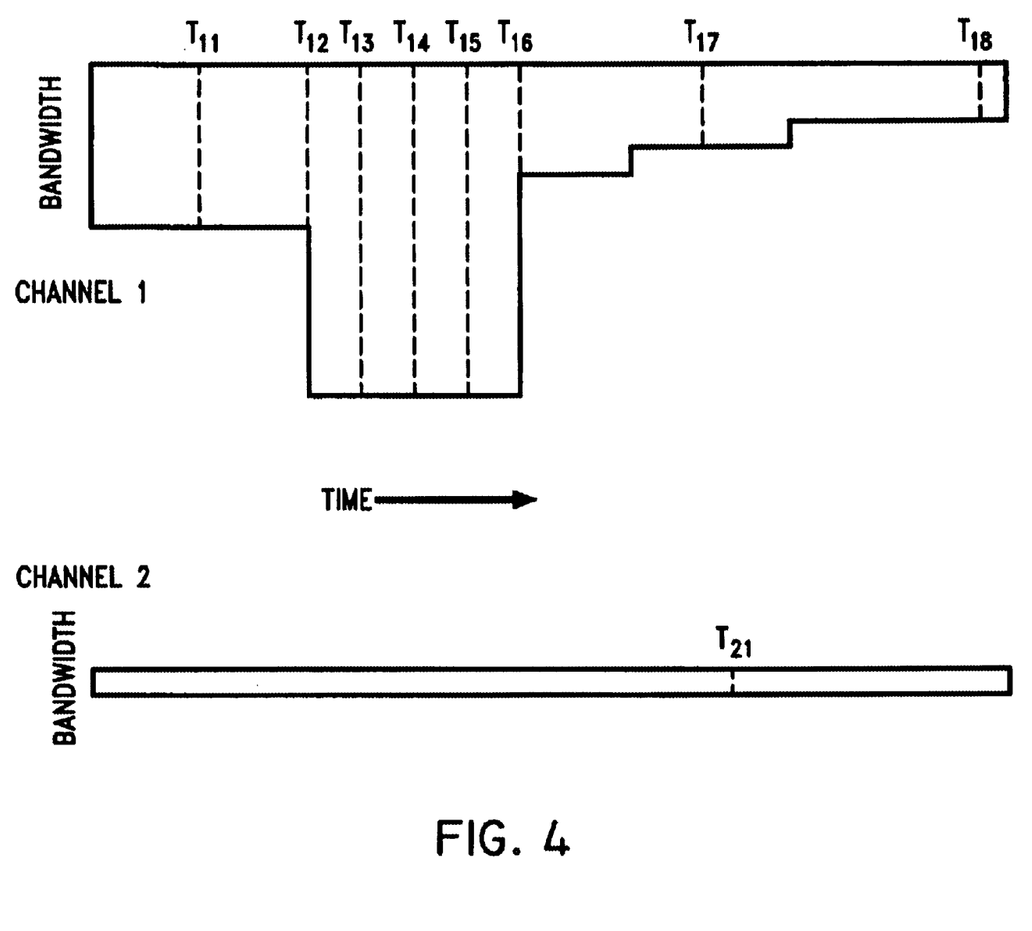
FIG. 4 depicts sample available channel bandwidths for two distinct channels, partitioned into time slots corresponding to equal amounts of work, which may vary over time.

Blocks 110 and 120 will now be described in greater detail. First, block 110 will be illustratively described based on the equal amounts of work for all tasks assumption and with reference to FIG. 4. FIG. 4 shows two different channels (1 and 2) which may be used to complete any or all of the various tasks. Channel 1 varies in terms of available bandwidth over time, and channel 2 does not. Channel 1 has more available bandwidth at all times than channel 2 does. Since each task involves the same amount of work, time may be divided into intervals (T) needed to complete a single task. All broadcast intervals designated in FIG. 4 as $T_i$ have the same area. For example, channel 1 can complete 8 broadcasts in the time shown, while channel 2 can only complete 1 such broadcast. The completion time of the kth task on channel j is denoted by $T_{jk}$ for each $1 \leq j \leq N$ and $1 \leq k \leq M$. (It is preferable for the tasks to be "packed" back to back without gaps). At most, M tasks may be scheduled on a given channel.

In the transportation problem, task assignments may be restricted or fixed in terms of channels and/or time slots. Channels may also be permitted to become available at arbitrary times, which allows scheduler 12 (FIG. 1) to honor previously computed task commitments. One way to do this is to right shift the time slots so that the first slot on each channel starts at the time the channel becomes available.

This increases the values of the appropriate $T_{jk}$'S. Moreover, the objective function (EQ. 1 herein below) may be completely arbitrary. The solution of a transportation problem may be accomplished quickly. See, for example, Ahuja, et al., *Network Flows*, Prentice Hall, 1993, incorporated herein by reference.

Figure 5:
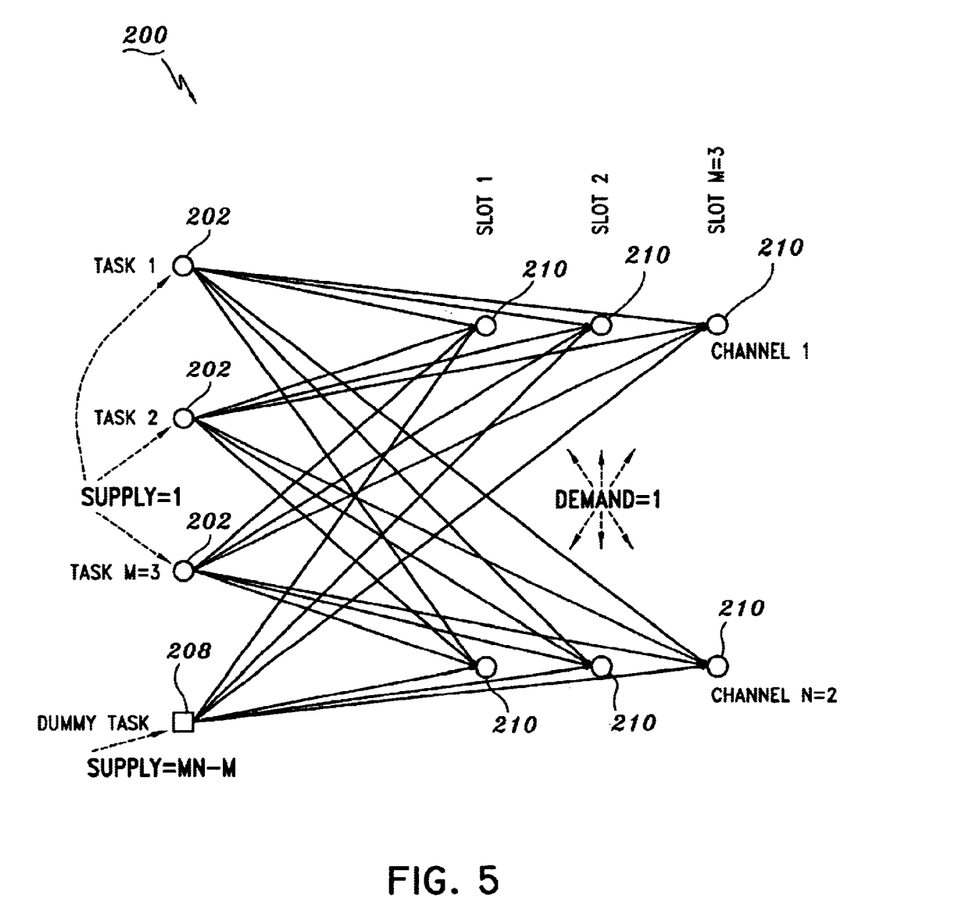
FIG. 5 is an illustrative transportation problem network for use with the present invention.

Referring to FIG. 5, the following will describe the details of specific transportation problem which is solved in block 110 of FIG. 2. A network 200 includes supply nodes 202 and demand nodes 204. The network 200 is bipartite, so that there will be one directed arc from each supply node 202 to each demand node 204.

There are two types of supply nodes 202, as follows. A first type includes M supply nodes corresponding to the batched distribution tasks. Each of these first type has a supply of 1 unit, and is indexed by $1 \leq i \leq M$. A second type includes a single dummy supply node 208 corresponding to unused channel slots, with supply MN−M. There is one demand node 210 per time slot (SLOT 1, SLOT 2, ...) and channel pair (CHANNEL 1, CHANNEL N=2), with a demand of 1. The channels and time slots are respectively indexed by $1 \leq j \leq N$ and $1 \leq k \leq M$. The cost of arc ijk emanating for a "true" supply node (202) i to a demand node (210) jk is $-h_i(T_{jk})$, and there is no cost associated with any arc emanating from the dummy node 208.

The illustrative network of FIG. 5, shows the underlying network for an example of this particular transportation problem. Here the number of broadcast tasks is M=3, which equals the number of meaningful time slots. The number of available channels is N=2. Note that the total sum of all supplies is MN, which equals the total sum of all demands.

The specific linear optimization problem solved by the transportation problem can be formulated as follows:

$$\text{Minimize} \sum_{i=1}^{M} \sum_{j=1}^{N} \sum_{k=1}^{M} [-h_i(T_{jk})f_{ijk}] \text{ such that } \sum_{i=1}^{M} f_{ijk} = \qquad \text{EQ. 1}$$

$$1 \forall \ 1 \leq j \leq N \text{ and } 1 \leq k \leq M,$$

and $f_{ijk} \leq 0 \ \forall 1 \leq i, k \leq M$ and $1 \leq j \leq N$.

Note that minimizing the objective function of EQ. 1 is identical to maximizing the revenue $$\sum_{i=1}^{M} \sum_{j=1}^{N} \sum_{k=1}^{M} h_i(T_{jk})f_{ijk}. \qquad \text{EQ. 2}$$

The nature of the transportation problem formulation ensures that there exists an optimal solution with integral flows, and a solution exists. This implies that each $f_{ijk}$ is binary. If $f_{ijk}=1$ then a digital object is assigned to the kth time slot of channel j. If it is needed to fix or restrict certain tasks from certain channel slots, this can be easily accomplished by simply changing the costs of the restricted directed arcs to infinity. (Fixing a task to a subset of channel slots is the same as restricting it from the complementary channel slots.)

Next, block 120 of FIG. 2 will be described in further detail. This is a cleanup heuristic which is based on true rather than surrogate task sizes. The results of block 110 may be regarded as determining a sequence of digital objects assigned to each channel. Though their true time lengths do not correspond exactly to the time slots of the transportation problem, they can be packed in the correct sequence, back to back without gaps. Such a packing can be regarded as the initial solution of the greedy heuristic in block 120. The greedy heuristic illustratively described herein is preferred. However, the invention may employ other algorithms to achieve the results. The greedy heuristic involves iteratively swapping arbitrary distinct tasks $1 \leq i_1 \neq i_2 \leq M$ in the current packed solution.

Given two candidate tasks of non-equal size, suppose without loss of generality that the work associated with digital object $i_1$ is less than the work associated with digital object $i_2$. If $i_1$ and $i_2$ are assigned to different channels and the tasks are swapped and repacked, then $i_1$ and all tasks originally packed beyond task $i_2$ will be left-shifted, that is, completed earlier than before. Similarly $i_2$ and all tasks originally packed beyond task $i_1$ will be right shifted, that is, completed later than before. If $i_1$ and $i_2$ are assigned to the same channel instead, then all tasks originally packed between the two (inclusive) will be shifted one way or the other. The point is that an incremental change in profit can easily be computed. So, in one instance of the embodiment, a greedy heuristic would examine the current solution, evaluate all possible pairs of tasks $1 \leq i_1 \neq i_2 \leq M$, evaluate the incremental gain for each, picking the pair with the best incremental gain if such gain is positive, or stopping at a local optimum if no pairs produce a positive incremental gain.

Figure 6:
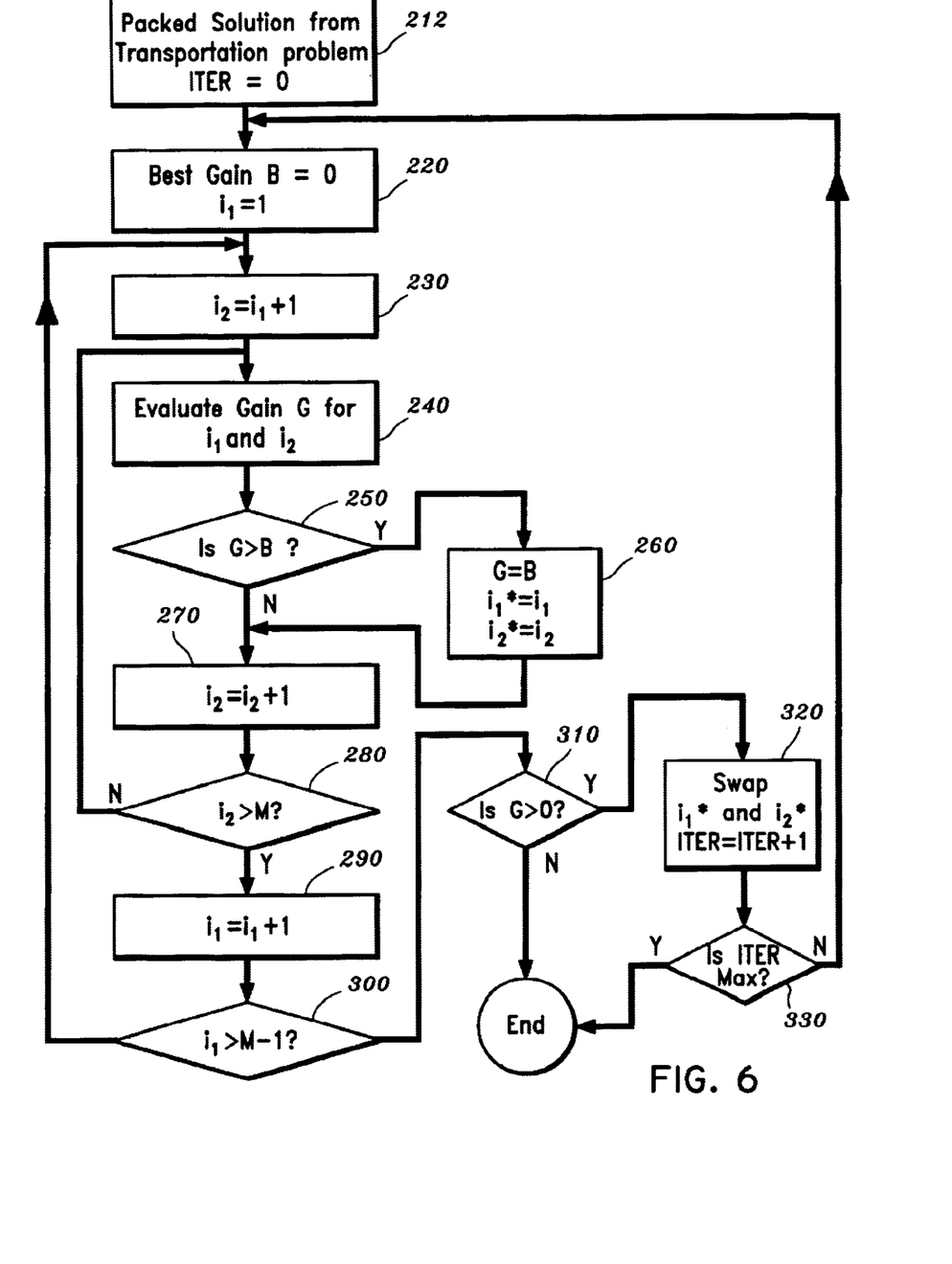
FIG. 6 is a flow diagram showing a greedy heuristic in accordance with the present invention.

In the case where a swap is accepted, the new packed schedule becomes the current solution, and the greedy heuristic is iterated. Eventually the process will stop with no acceptable improvements, and this solution is locally optimal. Referring now to FIG. 6, block 120 of FIG. 2 includes the greedy heuristic as explained in greater detail herein below. Step 212 shows initialization with a packed solution from the transportation problem and a setting of the greedy iteration counter ITER=0. Step 220 shows the initialization of a best gain B to 0 and the initialization of $i_1=1$. Step 230 shows the initialization of $i_2$ to $i_1+1$. Step 240 evaluates a gain G for $i_1$ and $i_2$. Step 250 is a test to see if the newly evaluated pair is better than a previous best solution. Step 260 shows acceptance of the new gain if the new pair is better. Steps 270 and 280 show the looping on $i_1$, while steps 290 and 300 show the looping on $i_2$ to provide a gain check for all available task pairs.

Step 310 is the test for local optimality of the current solution. If gain G is greater than 0 the program path is directed to step 320. Otherwise, the program ends. Step 320 provides acceptance of the improved solution by swapping the new $i_1$ and $i_2$, and the greedy iteration counter is incremented. Step 330 is a test of the greedy iteration counter to determine if ITER is its maximum value. If it is the program ends. Otherwise, return to step 220.

There are, alternatively, other greedy heuristics which may be employed as well. For example, rather than pick the "best" improvement one could find the "first" improvement instead. Ordering both of the candidate tasks by a "bang for the buck", one for purposes of shifting left and one for shifting right will help ensure that first improvements will be found relatively quickly.

Eliminating Pricing Alternatives

It is possible, due to previous scheduling commitments, that certain pricing alternatives may not be feasible for a customer at a given time. It is thus reasonable and prudent for the e-commerce merchant not to offer such pricing alternatives. More subtly, a pricing alternative may be feasible but not desirable for the e-commerce merchant. When a customer purchases digital object i, it is desirable to compute a minimum time $\tau_i$ possibly equal to the current time, and offer only pricing alternatives greater than or equal to $\tau_i$. The present invention computes this value of $\tau_i$ in the following way. First, for any candidate I one can solve the transportation problem under the assumption that all time slots completing after time $\tau$ are restricted. As noted before, this is relatively easy to do. Comparing the value of the objective function (EQ. 1) for this solution with that of the solution without additional constraints, it can be decided to accept or reject $\tau$ depending on whether these values are within some predetermined threshold. A bracket and bisection technique can then be employed to choose appropriate values of $\tau$ to test. For details on bracket and bisection techniques see, for example, Press, W., Flannery, B., Teukolsky, S. and Vetterling, W., *Numerical Recipes*, Cambridge University Press, 1986, incorporated herein by reference. Another strategy may be to offer the earliest pricing alternatives to the more popular digital objects.

Offering Bargains to Encourage Pricing Alternatives

A customer may wish to purchase a digital object which has already been committed to be transmitted to a prior customer, or possibly one with single or multiple other customers for which would yield an earlier scheduled time for delivery. It may be advantageous to encourage the customer to choose the early time pricing alternatives. By offering bargains, e.g., lowering prices, this behavior can be encouraged. The probability of purchase may be estimated as a function of cost. By employing a probability of purchase versus cost relationship as collected based on marketing information, it is possible to optimize the expected profit achieved by the e-commerce merchant, and pick the reduced costs accordingly.

Other methods may be employed which provide incentives to customers to further optimize profits.

Figure 7:
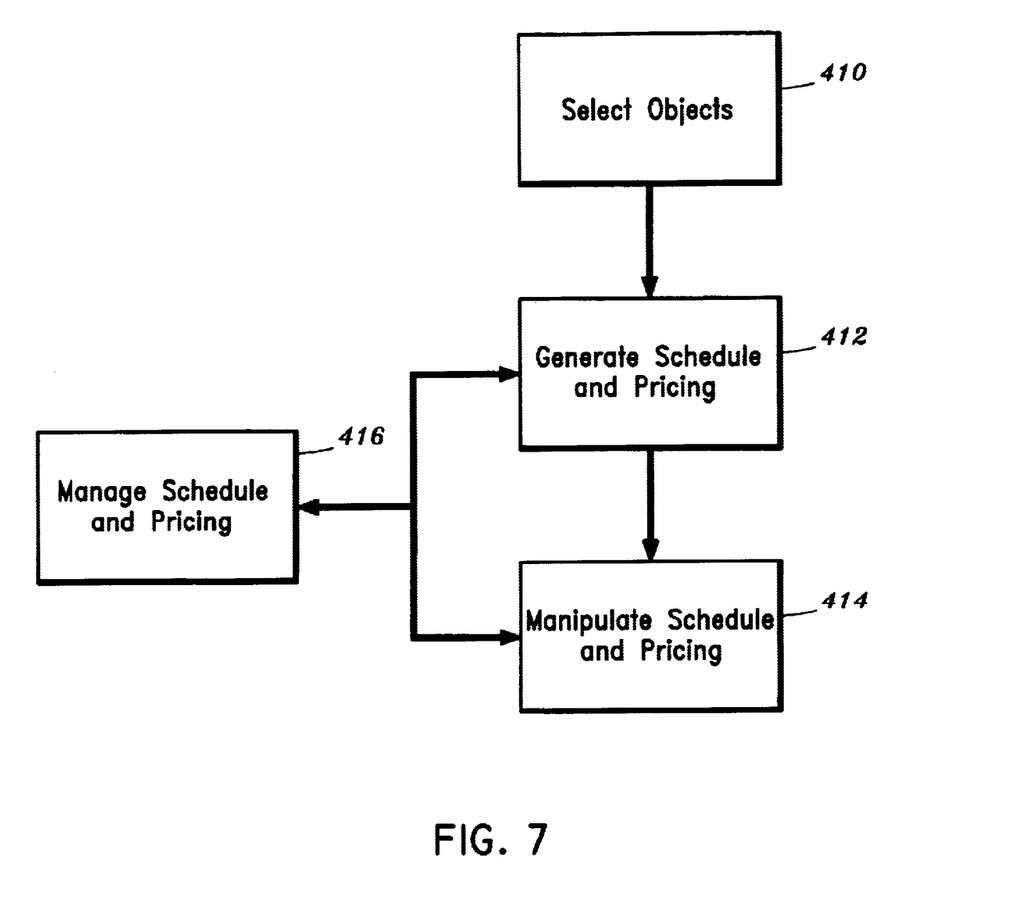
FIG. 7 is a flow diagram showing a method for optimizing profits in electronic delivery of digital objects.

Referring now to FIG. 7 and also to FIG. 1, a flow diagram for a method for optimizing profits in the delivery of digital objects, in accordance with the present invention is shown. In a block 410, a request for receiving digital objects is placed from a user interface 22. User interface 22 may include a set box 24 (FIG. 1) for a television set or a personal computer which can interact with a televison, satellite or cable network. A menu or program information is displayed on television set box. The displayed information preferably includes digital objects to be downloaded. Digital objects may include movies, videos, audio tracks, or any other stored media transmittable over a network 18. Network 18 preferably schedules transmission of digital objects in accordance with a programming schedule or network downtime. Network 18 includes a transmission source 20 which transits digital objects. Transmission of various objects can be performed continuously over a plurality of channels depending on available bandwidth. In block 412, a schedule and pricing is generated for the digital objects based on the digital object selected and existing delivery commitments. This may be performed in accordance with the step functions, for example, the step functions in FIG. 2. This may include formulating a transportation problem to determine a delivery sequence for the digital objects and solving the transportation program to determine the delivery sequence based on profits.

In block 414, the schedule and pricing are manipulated, preferably in accordance with FIG. 2 to provide a profitable delivery of the digital objects. This may include swapping the digital objects to improve the delivery sequence based on profitability. In a preferred embodiment, a greedy heuristic is employed to provide the swapping.

In block 416, a scheduler 12 makes decisions for transmission sources 20 having multiple channels, which may vary in bandwidth. Scheduler 12 is used to schedule delivery of the digital objects and determine which digital objects are to be delivered via which channels. Scheduler 12 preferably utilizes cost functions to estimate which channels are to be used to maximize profits by, for example, increasing delivery speeds for the most popular digital objects. Scheduler 12 estimates costs and may influence prices depending on delivery times which can be achieved.

Scheduler 12 optimally schedules the delivery of the pending digital objects. Scheduler 12 preferably determines when to deliver each digital object and which channel will carry each digital object, thereby maximizing the total amount of revenue obtained in the delivery of the digital objects by determining the most expedient channel(s) to use. Such scheduling may be performed in accordance with FIG. 3, for example. Scheduler 12 preferably dynamically decides which of the alternate delivery times for a customer will be best from an overall profit perspective, and may only offer the customer those options. Further, by dynamically deciding which alternate delivery times for a customer will be best from an overall profit perspective, and intelligently discounting the costs for such delivery times in an effort to encourage the customer to choose amongst those times, additional profits may be achieved.

Scheduler 12 provides calculations for predetermining a minimum reasonable amount of time ($\tau$) needed to deliver a digital object by request of a customer, and only offering to the customer those delivery options which meet or exceed the predetermined amount of time.

Having described preferred embodiments of a system and method for optimizing profits in electronic delivery of digital objects(which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for selecting a channel and delivery time for digital objects for a broadcast delivery service including multiple channels of varying bandwidths comprising the steps of:

selecting digital objects to be sent over the multiple channels;

dynamically deciding a number of delivery times to provide the highest possible amount of revenue;

discounting costs for the delivery times to encourage customers to choose among the number of delivery times; and generating a schedule and pricing for the digital objects by determining when to deliver each digital object and determining which channel will carry each digital object to provide a highest possible amount of revenue from the delivery of the digital objects.

2. The method as recited in claim 1, further comprises the steps of determining an amount of time needed to deliver a digital object pursuant to a request; and offering delivery options which meet or exceed the amount of time.

3. The method as recited in claim 1, further comprises the steps of dynamically deciding which delivery times to provide the highest possible amount of revenue; and offering delivery options in accordance with the delivery times.

4. The method as recited in claim 1, further comprising the steps of:

formulating a transportation problem to determine a delivery sequence for the digital objects; and solving the transportation problem to determine the delivery sequence based on profitability.

5. The method as recited in claim 4, wherein the step of solving the transportation program includes the step of:

assuming all deliveries include the same amount of work.

6. The method as recited in claim 4, further comprises the step of:

swapping the digital objects to improve the delivery sequence based on profitability.

7. The method as recited in claim 6, wherein the step of swapping includes the step of swapping the digital objects by employing a greedy heuristic.

8. The method as recited in claim 1, wherein the step of generating a schedule and pricing for the digital objects is based on available bandwidth of the channels.

9. A method for selecting a channel and delivery time for digital objects for a broadcast delivery service including multiple channels of varying bandwidths comprising the steps of:
- selecting digital objects to be sent over the multiple channels;
- formulating and solving a transportation problem to generate a delivery sequence for the digital objects according to the digital objects and existing delivery commitments;
- dynamically deciding a number of delivery times to provide the highest possible amount of revenue;
- discounting costs for the delivery times to encourage customers to choose among the number of delivery times; and
- manipulating the delivery sequence by determining when to deliver each digital object and determining which channel will carry each digital object to provide a highest possible amount of revenue from the delivery of the digital objects.

10. The method as recited in claim 9, further comprises the steps of determining an amount of time needed to deliver a digital object pursuant to a request; and offering delivery options which meet or exceed the amount of time.

11. The method as recited in claiming 9, further comprises the steps of dynamically deciding which delivery times to provide the highest possible amount of revenue; and offering delivery options in accordance with the delivery times.

12. The method as recited in claim 9, wherein the step of formulating and solving the transportation problem includes the step of:
- assuming all deliveries include the same amount of work.

13. A method for selecting a channel and delivery time for digital objects for a broadcast delivery service including multiple channels of varying bandwidths comprising the steps of:
- selecting digital objects to be sent over the multiple channels;
- formulating and solving a transportation problem to generate a delivery sequence for the digital objects according to the digital objects and existing delivery commitments;
- manipulating the delivery sequence by determining when to deliver each digital object and determining which channel will carry each digital object to provide a highest possible amount of revenue from the delivery of the digital objects; and
- swapping the digital objects to improve the delivery sequence based on profitability.

14. The method as recited in claim 13, wherein the step of swapping includes the step of swapping the digital objects by employing a greedy heuristic.

15. A system for selecting a channel and delivery time for digital objects for a broadcast delivery service including multiple channels of varying bandwidths comprising:
- at least one user interface for selecting objects to be transmitted thereto, the user interface for identifying and receiving object transmissions corresponding to the selected objects over channels having available bandwidth; and
- a scheduler for managing the network channels and object transmission sequences, the scheduler for generating a schedule and pricing for the digital objects to be transmitted by determining when to deliver each digital object and determining which channel will carry each digital object to provide a highest possible amount of revenue from the delivery of the digital objects; wherein the scheduler determines a number of delivery times to provide the highest possible amount of revenue and discounts costs for the delivery times to encourage customers to choose among the number of delivery times.

16. The system as recited in claim 15, wherein the scheduler determines an amount of time needed to deliver a digital object pursuant to a request, and offers delivery options which meet or exceed the amount of time.

17. The system as recited in claim 15, wherein the scheduler determines a number of delivery times which provide the highest possible amount of revenue and offers delivery options in accordance with the number of delivery times.

18. The system as recited in claim 15, wherein the scheduler includes means for formulating and solving a transportation problem to determine a delivery sequence for the digital objects based on profitability.

19. A system for selecting a channel and delivery time for digital objects for a broadcast delivery service including multiple channels of varying bandwidths comprising:
- at least one user interface for selecting objects to be transmitted thereto, the user interface for identifying and receiving object transmissions corresponding to the selected objects over channels having available bandwidth; and
- a scheduler for managing the network channels and object transmission sequences, the scheduler for generating a schedule and pricing for the digital objects to be transmitted by determining when to deliver each digital object and determining which channel will carry each digital objects to provide a highest possible amount of revenue from the delivery of the digital objects; wherein the scheduler employs a greedy heuristic for swapping the digital objects to improve the delivery sequence based on profitability.

20. The system as recited in claim 15, wherein the multiple channels of varying bandwidths are included in one of a television network, a satellite television network and a cable television network.

* * * * *